United States Patent
Hazelton et al.

(10) Patent No.: US 11,830,022 B2
(45) Date of Patent: Nov. 28, 2023

(54) STOCK REWARDS IN CONSUMER TRANSACTIONS

(71) Applicant: Stash Financial, Inc., New York, NY (US)

(72) Inventors: Clifford Hazelton, Basking Ridge, NJ (US); Adam Finley, Rhinebeck, NY (US); Michael Barany, Bergenfield, NJ (US); Kyle Schustak, Brooklyn, NY (US); Brandon Krieg, Tarrytown, NY (US); Edward Robinson, London (GB); Evan Weiss, Brooklyn, NY (US)

(73) Assignee: Stash Financial, Inc., New York, NY (US)

( * ) Notice: Subject to any disclaimer, the term of this patent is extended or adjusted under 35 U.S.C. 154(b) by 0 days.

(21) Appl. No.: 17/941,731

(22) Filed: Sep. 9, 2022

(65) Prior Publication Data

US 2023/0005005 A1 Jan. 5, 2023

Related U.S. Application Data

(62) Division of application No. 16/808,108, filed on Mar. 3, 2020, now Pat. No. 11,443,338.

(Continued)

(51) Int. Cl.
| | |
|---|---|
| *G06Q 30/00* | (2023.01) |
| *G06Q 30/0207* | (2023.01) |
| *G06N 3/08* | (2023.01) |
| *G06N 3/10* | (2006.01) |
| *G06Q 20/12* | (2012.01) |

(Continued)

(52) U.S. Cl.
CPC ........ *G06Q 30/0216* (2013.01); *G06N 3/08* (2013.01); *G06N 3/10* (2013.01); *G06Q 10/10* (2013.01); *G06Q 20/127* (2013.01); *G06Q 20/202* (2013.01); *G06Q 30/0213* (2013.01); *G06Q 40/04* (2013.01); *H04L 63/123* (2013.01)

(58) Field of Classification Search
None
See application file for complete search history.

(56) References Cited

U.S. PATENT DOCUMENTS

| | | |
|---|---|---|
| 10,798,200 B2 | 10/2020 | Kondamuri et al. |
| 2002/0035622 A1 | 3/2002 | Barber |

(Continued)

OTHER PUBLICATIONS

International Search Report and Written Opinion issued in corresponding International Application No. PCT/US2020/020827, dated Jul. 3, 2020.

(Continued)

*Primary Examiner* — Matthew T Sittner
(74) *Attorney, Agent, or Firm* — McDermott Will & Emery LLP

(57) ABSTRACT

A method that includes receiving a string from a remote station, the string associated with an interaction event between a user and the remote station, is provided. The method includes verifying that the string includes a content validation for a user account in a network service, mapping at least a portion of the string to a ticker symbol associated with an entry in a database and transmitting, to the user, a message indicating that a fractional value associated with the ticker symbol has been added to the user account in the network service. A system configured to execute the above method is also provided.

18 Claims, 10 Drawing Sheets

Related U.S. Application Data

(60) Provisional application No. 62/813,791, filed on Mar. 5, 2019.

(51) Int. Cl.
*H04L 9/40* (2022.01)
*G06Q 40/04* (2012.01)
*G06Q 20/20* (2012.01)
*G06Q 10/10* (2023.01)

(56) References Cited

U.S. PATENT DOCUMENTS

| | | | |
|---|---|---|---|
| 2003/0004803 A1* | 1/2003 | Glover | G06Q 40/00 |
| | | | 705/14.18 |
| 2011/0166922 A1* | 7/2011 | Fuerstenberg | G07G 1/0036 |
| | | | 705/14.1 |
| 2014/0114737 A1* | 4/2014 | Espejo | G06Q 30/02 |
| | | | 705/14.27 |
| 2014/0164215 A1 | 6/2014 | Parsons et al. | |
| 2014/0181483 A1 | 6/2014 | O'Connor et al. | |
| 2016/0005126 A1* | 1/2016 | Ghosh | G06Q 40/06 |
| | | | 705/36 R |
| 2017/0140411 A1* | 5/2017 | Lele | G06Q 40/04 |
| 2018/0330382 A1 | 11/2018 | Chen et al. | |
| 2019/0012300 A1* | 1/2019 | Qi | G06F 40/194 |
| 2019/0050887 A1* | 2/2019 | Nelsen | G06Q 30/0201 |
| 2020/0051116 A1 | 2/2020 | Nelsen et al. | |

OTHER PUBLICATIONS

Extended European Search Report issued in the corresponding European Patent Application No. 20766808.8 dated Nov. 2, 2022.

* cited by examiner

FIG. 5

STOCK REWARDS IN CONSUMER TRANSACTIONS

CROSS REFERENCE TO RELATED APPLICATIONS

This application claims priority under 35 U.S.C. § 121 as a divisional of U.S. patent application Ser. No. 16/808,108, filed on Mar. 3, 2020, now U.S. Pat. No. 11,443,338, which claims priority under 35 USC § 119(e) to U.S. Provisional Patent Application Ser. No. 62/813,791 entitled STOCK REWARDS IN CONSUMER TRANSACTIONS, to Brandon KRIEG et al., filed on Mar. 5, 2019, the contents of which are hereby incorporated by reference in their entirety, for all purposes.

BACKGROUND

Field

The present disclosure generally relates to systems and procedures for analyzing transaction strings associated with a point-of-sale transaction, and triggering a financial transaction as a reward for a cardholder commanding a transaction based upon a match with a list in a database.

Related Art

It is expected that a consumer consciously or subconsciously desires to purchase specific stocks based on his or her everyday spending activity comprised of entering into transactions at merchants and based on the moment of such transactions. However, multiple consumers may find themselves purchasing equity securities less regularly than they would prefer and not investing in the companies that such consumers spend at the most. Moreover, consumers tend to feel more favorable about spending money and using certain credit/debit cards when a rewards program provides benefits related to consumption and purchasing activity in the form of equity investment opportunity. However, the ability of rewarding purchasing habits and supporting investments via rewards in equity securities to consumers has been hindered by the lack of wide bandwidth network operations that enable communication between one or more remote servers, a mobile computer device in the hands of the consumer, a fixed computer device at a point-of-sale (POS) of a retail store or any other vendor, and an efficient centralized operation that quickly accesses a database, matches data strings, and determines appropriate reward actions for the consumer, in real time.

SUMMARY

In a first embodiment, a computer-implemented method is provided that includes receiving a string from a remote station, the string associated with an interaction event between a user and the remote station. The computer-implemented method also includes verifying that the string includes a content validation for a user account in a network service, mapping at least a portion of the string to a ticker symbol associated with an entry in a database, and transmitting, to the user, a message indicating that a fractional value associated with the ticker symbol has been added to the user account in the network service.

In a second embodiment, a system includes a memory circuit storing instructions and one or more processors configured to execute the instructions. Upon execution of the instructions by the one or more processors, the system is configured to receive a string from a remote station, the string associated with a purchase by a user, to verify that the string includes a content validation for a user account in a network service, and to map at least a portion of the string to a ticker symbol associated with an entry in a database. The system is also configured to transmit, to the user, a message indicating that a fractional value associated with the ticker symbol has been added to the user account in the network service.

In yet another embodiment, a computer-implemented method includes selecting a string based on a pre-selected name, mapping the string to a symbol for a third party, forming a regular expression based on the string, and parsing an event report from a remote device to find a match for the regular expression. The computer-implemented method also includes evaluating a matching value between the event report and the string, determining a fractional value of the third party based on the matching value, and providing a reward message to a user identified in the event report, based on the fractional value of the third party.

BRIEF DESCRIPTION OF THE DRAWINGS

FIG. 5 illustrates graphic payloads for display in cardholder mobile devices over pre-selected advertisement campaigns, according to some embodiments.

Figure 1:
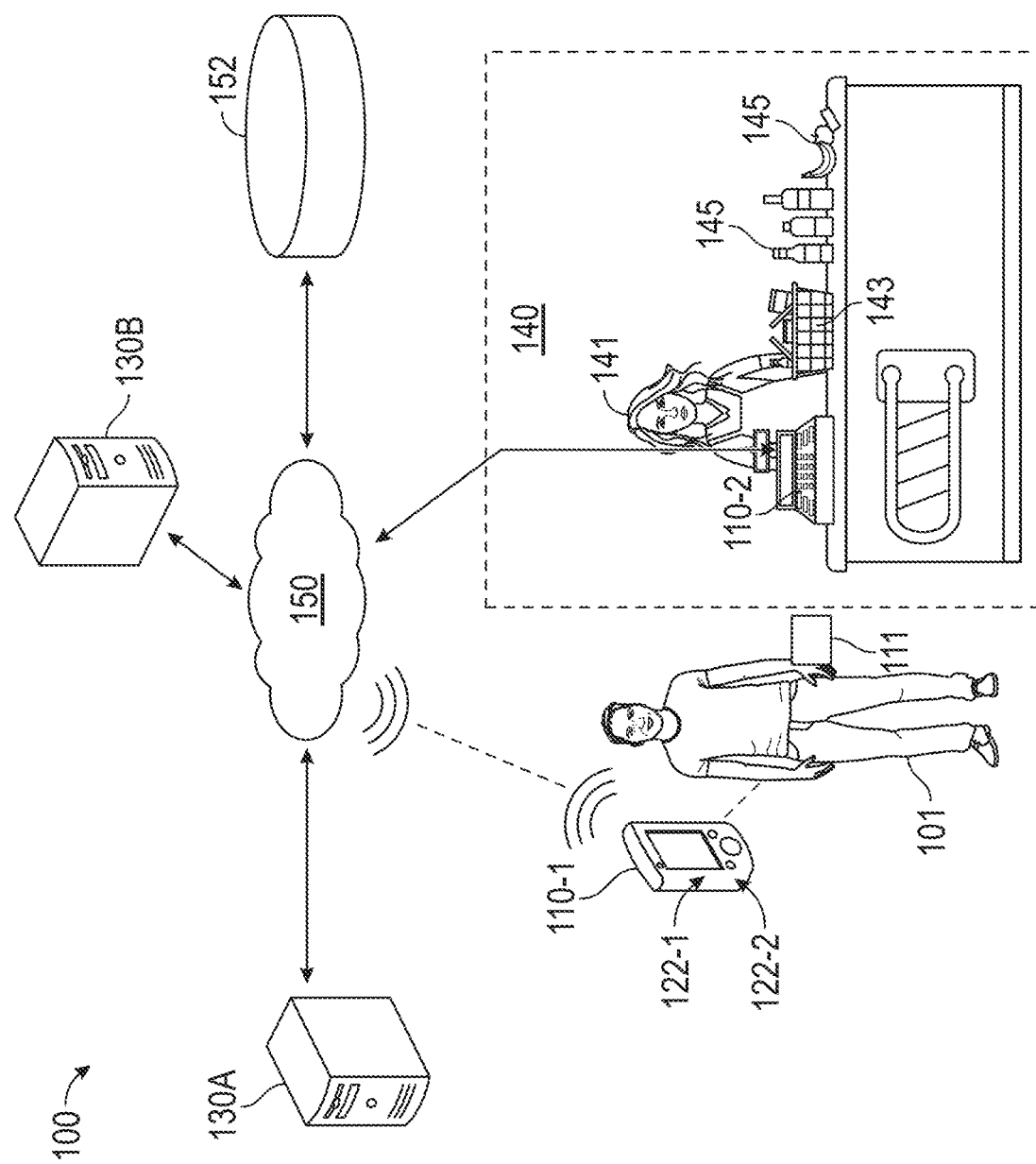
FIG. 1 illustrates a system configured for providing cardholders with stock rewards in debit [or credit] card transactions, according to some embodiments.

In the figures, elements and steps having the same or similar reference labels have the same or similar description and features, unless otherwise stated.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Methods and systems as disclosed herein provide rewards to consumers after using a debit/credit card in the purchase of certain products or services at a retail store. The rewards may include fractional shares of stock of publicly traded enterprises or exchange-traded funds (ETF) upon purchase transactions, wherein the fractional amount is determined based on a purchase amount and a reward policy. More specifically, the present disclosure relates to cardholder rewards upon use of a debit card or a credit card, the rewards including a fractional share of stock of a merchant, or a related publicly traded enterprise, or an ETF. The merchant may be associated to the retail store where the consumer made the purchase, or a manufacturer or provider of a specific branded consumer product or line of products sold at a certain store.

A system as provided herein is configured to enable a cardholder who subscribes to a network service to earn fractional shares of stock of certain publicly traded companies and/or ETFs on certain qualifying purchases made using a card. The card may be a debit or credit card associated with an account in a financial institution associated with the network service. The network service may include a banking service (e.g., including a debit or credit account), a broker service (e.g., servicing a brokerage account), or a combination thereof. For example, in some embodiments, a combination is desirable to include debit card transactions handled by one party and a brokerage account to hold securities handled by an independent party.

Embodiments as disclosed herein include devices and methods of using the devices for matching a cardholder transaction at a store, at a merchant outlet, at an online merchant, or a service provider, with an asset in a publicly traded enterprise. The asset in the publicly traded enterprise may be a stock of the store owner, the merchant, or the service provider, if any of the above is publicly traded. In some embodiments, the asset in the publicly traded enterprise may be a stock of a publicly traded enterprise owning some interest in the store, the merchant, or the service provider. In other embodiments, the publicly traded enterprise may include an ETF in an industry closely associated with the store, the merchant, or the service provider. In some embodiments, a cardholder subscribing to services disclosed herein may select a "default" ETF of their choice.

Embodiments as disclosed herein provide a technical solution to a problem arising in the computer and networking technology.

FIG. 1 illustrates a system 100 configured for providing a cardholder 101 with stock rewards in debit or credit card transactions, according to some embodiments. As shown in the figure, cardholder 101 is at a point-of-sale (POS) 140 in a store (e.g., a retail store, a department store, restaurant, franchise, and the like), ready to purchase products 145 in a shopping basket 143 with a debit or credit card 111. The cardholder may be a subscriber of a network service provided by a banking server 130A through a network 150. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like. Banking server 130A may be configured to offer and manage a banking account and a debit or credit card to the cardholder. Banking server 130A may also be in communication with a broker server 130B. Broker server 130B may be configured to offer taxable brokerage accounts to cardholder 101 through a personal brokerage account. Moreover, in some embodiments, a cardholder account with broker server 130B may be linked to a cardholder account with banking server 130A. Further, in some embodiments, banking server 130A and broker server 130B may be two network servers within the same enterprise or organization. Banking server 130A and broker server 130B will be collectively referred to, hereinafter in general, as servers 130 providing network services.

The network services provided by servers 130 may include financial transactions that cardholder 101 performs through server 130, including access to an account (e.g., a debit or credit account) at a financial institution, through card 111. In some embodiments, as part of the network service, servers 130 may host an application programming interface 122-1 (API) or a software development kit (SDK) 122-2 installed in a memory of a mobile device 110-1 registered to cardholder 101. API 122-1 and SDK 122-2 will be collectively referred to, hereinafter, as "applications 122." Mobile device 110-1 may be a cell phone, a smart phone, a palm device, or a laptop, having a communications module to enable wireless communication with network 150. Through API 122-1 or SDK 122-2, cardholder 101 may access a personal account, review debit or credit account status and statements, and perform other financial operations hosted by servers 130. In some embodiments, servers 130 may notify cardholder 101 about offers, account updates, and other information through messaging API 122-1 or SDK 122-2 (e.g., push notifications, e-mail, and the like).

In some embodiments, a cashier 141 scans products 145 and shopping basket 143 in POS device 110-2, and cardholder 101 swipes card 111 in a POS device 110-2 to complete the transaction. Mobile device 110-1 and POS device 110-2 will be collectively referred to as "client devices 110." When cardholder 101 swipes card 111, a purchase transaction is in a "pending" status. POS device 110-2 sends, via network 150, a message of the purchase to one of servers 130, which handles the financial liability for card 111 from cardholder 101. In some embodiments, the message includes information on the merchant and swipe amount. The message may include a transaction string listing a merchant code, a merchant category, a merchant description, a merchant name, a total cost, and other information associated with POS 140. For example, a transaction string may include a merchant name or code identifying the store, merchant, or service providing the products in the transaction. Accordingly, products 145 may include consumer products or other intangible services such as tickets (for a movie, concert, or travel), hotel or restaurant reservations, online transactions, and the like.

In some embodiments, servers 130 may determine that cardholder 101 is due a reward of fractional shares of stock, based on the transaction and rules of service in a contract between cardholder 101 and servers 130. Accordingly, servers 130 may generate a message to cardholder 101 (e.g., via any one of applications 122) announcing the reward. For example, in some embodiments, servers 130 may post the following message to cardholder 101 through a messaging application 122: "You just earned [merchant's name] stock by paying with your debit card!"

In some embodiments, servers 130 determine qualifying purchase transactions that may result in the allocation of fractional shares of stock to the personal brokerage account when the purchase transaction moves from the 'pending' status to a 'completed' status (e.g., within two business days of the purchase, or maybe more).

Servers 130 may be configured to create a non-cancellable trade order for the merchant in a pre-determined amount. In some embodiments, broker server 130B may also be configured to trade an investment buy order from a subscriber (e.g., cardholder 101) at a current stock value. In some embodiments, broker server 130B generates a trade confirmation and sends an e-mail to a registered e-mail ID for cardholder 101. In some embodiments, one of servers 130 may generate a message to cardholder 101, indicating that a stock reward has been traded. Accordingly, cardholder 101 can check details through applications 122. In some embodiments, a database 152 communicatively coupled to servers 130 through network 150 may store a log of the transactions by cardholder 101, including the stock rewards. In some embodiments, database 152 maintains and updates a status of an account for cardholder 101 with at least one, or both, of banking server 130A and broker server 130B.

Figure 2:
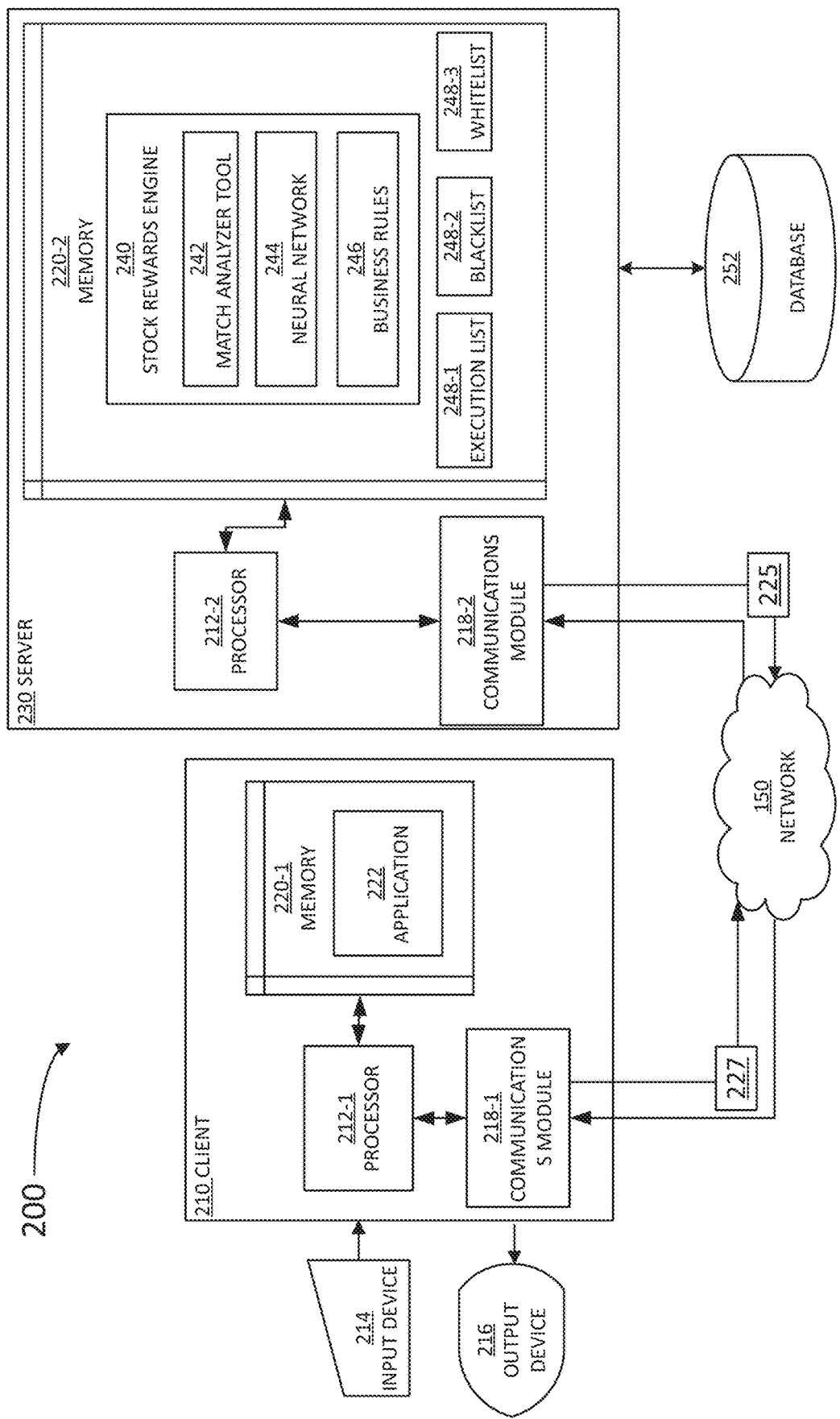
FIG. 2 illustrates a detailed view of a client device and a server as used in the system of FIG. 1, according to some embodiments.

FIG. 2 illustrates a detailed view of a client device 210 and a server 230 as used in system 200 (e.g., client devices 110 and servers 130 in system 100), according to some embodiments. Client device 210 and server 230 include processor circuits 212-1 and 212-2 (hereinafter, collectively referred to as "processor circuits 212"), respectively. Client device 210 and server 230 also include memory circuits 220-1 and 220-2 (hereinafter, collectively referred to as "memory circuits 220"), respectively. Memory circuits 220 store data and instructions which, when executed by processors 212 cause system 200 to perform at least partially one or more steps in methods consistent with the present disclosure. In some embodiments, client device 210 and server 230 include communications modules 218-1 and 218-2 (hereinafter, collectively referred to as "communications modules 218"), respectively. Client device 210 and server 230 may communicate with each other through network 150 via communications modules 218. Communications modules 218 may include radio-frequency (RF) hardware and software, such as antennas and circuits, including digital processing circuits and radios, digital to analog converters (DACs), analog-to-digital converters, RF filters and amplifiers, and the like. In some embodiments, communications modules 218 may be configured for wired or wireless communications, including Ethernet, modem, WiFi, BlueTooth, near field contact (NFC) communications, or any combination of the above.

In some embodiments, memory 220-1 may include an application 222 installed in client device 210 and hosted by server 230 (e.g., applications 122). In some embodiments, server 230 provides messages, e-mails, or any other communications with a user through application 222. For example, in some embodiments, server 230 may push an advertisement payload 225 (e.g., offers and other visual information) to the user for display in client device 210, through application 222. Client device 210 may also include an input device 214 and an output device 216. Input device 214 may include a touch screen display, a mouse, a keyboard, a stylus, a barcode scanner, a speaker, or any combination of the above. Output device 216 may include a display, a speaker, an alarm, or any combination of the above.

Client device 210 may be associated with a cardholder (e.g., mobile device 110-1 associated with cardholder 101) or with a POS (e.g., POS device 110-2 associated with POS 140). In that regard, in some embodiments, system 200 may include one or more client devices 210 communicating with each other and with one or more servers 230. For example, in some embodiments, client device 210 is a POS device and application 222 provides a transaction record 227 to server 230 via communications module 218-1 through network 150. The transaction record may be credit card or debit card receipt of a purchase made by a cardholder at the POS. In some embodiments, application 222 in client device 210 may identify a credit card or debit card (e.g., card 111) as belonging to a rewards service provided or hosted by server 230, and provide the transaction record to server 230. Server 230 then provides a stock reward to the cardholder based on information from the transaction record 227. In some embodiments, transaction record 227 includes a string including fields such as card data fields, including: City, Merchant industry code, Merchant industry description, Merchant name, and geographic information (e.g., State/Region of the POS).

In some embodiments, transactions record 227 include text strings in ASCII code characters indicative of: A unique transaction identification number or code (UUID), a transaction amount (how much was spent), a transaction time (when was the money spent); and a transaction status (pending, completed, or canceled). Transactions record 227 may also include a matched ticker (of stock to receive, default ETF if no match), a reward amount (how much of the stock they'll be rewarded, e.g., as ascertained by application 222), a reward percentage (percentage of transaction amount that will be rewarded), and a transaction merchant name (as would appear on a debit card statement). In some embodiments, transactions record 227 may also include a fund status (the status of us providing the funds to the user which will be used to make the stock purchase), and a trade status (the status of the stock trade which will be made to obtain the stock rewarded to the user).

Memory circuit 220-2 may include a stock rewards engine 240. Stock rewards engine 240 may also include a match analyzer tool 242 and a neural network 244. In some embodiments, stock rewards engine 240 receives a transaction record from client device 210 and provides a stock reward to a user based on the transaction record. For example, stock rewards engine 240 may select a string in the transaction record and match it, using match analyzer tool 242, to a symbol list stored in any one of an execution list 248-1, a blacklist 248-2, and a whitelist 248-3 (hereinafter, collectively referred to as "lists 248"). Lists 248 may be included in memory circuit 220-2 or in database 252. To select the string from the transaction record, and to do the matching, stock rewards engine 240 may use neural network 244, or any other non-linear algorithm such as machine learning or artificial intelligence algorithm. In some embodiments, stock rewards engine 240 may also use a linear regression algorithm or any combination of the above, to achieve a matching of a string in the transaction record with a symbol for a third party in any one of lists 248. The third party may be a publicly traded stock.

Stock rewards engine 240 may also include a business rules block 246, which may include rules that implement business, product, and marketing strategies such as offers, promotions, and advertisement campaigns. Business rules block 246 may be updated based on historical data collected by stock rewards engine 240, using machine learning and other algorithms in neural network 244. In some embodiments, bonuses based on prior activity or pending some future action may be available to any cardholder subscribing to the service provided by stock rewards engine 240. Business rule block 246 may also classify different cardholders in tiers. For example, a cardholder may be included in a premium tier. Business rule block 246 may determine that premium tier users get double rewards. Additionally, business rules block 246 may assign bonuses available to premium tier users (e.g., during the month of February premium users who spend at intuit, which owns turbotax, mint, and quickbooks, get 3% while non-premium users get the normal rate). In some embodiments, business rules block 246 may also list or include a default ETF selected by a cardholder. The cardholder may select, via application 222, a default ETF to assign rewards when match analyzer tool 242 is not able to find a merchant match to a public company in database 252. In some embodiments, when the cardholder has not selected a default option, business rules block 246 may select a universal default ETF. In some embodiments, business rules block 246 also determines a card activation time, so that several promotions ran around receiving additional rewards for actions take soon after card activation.

Figure 3:
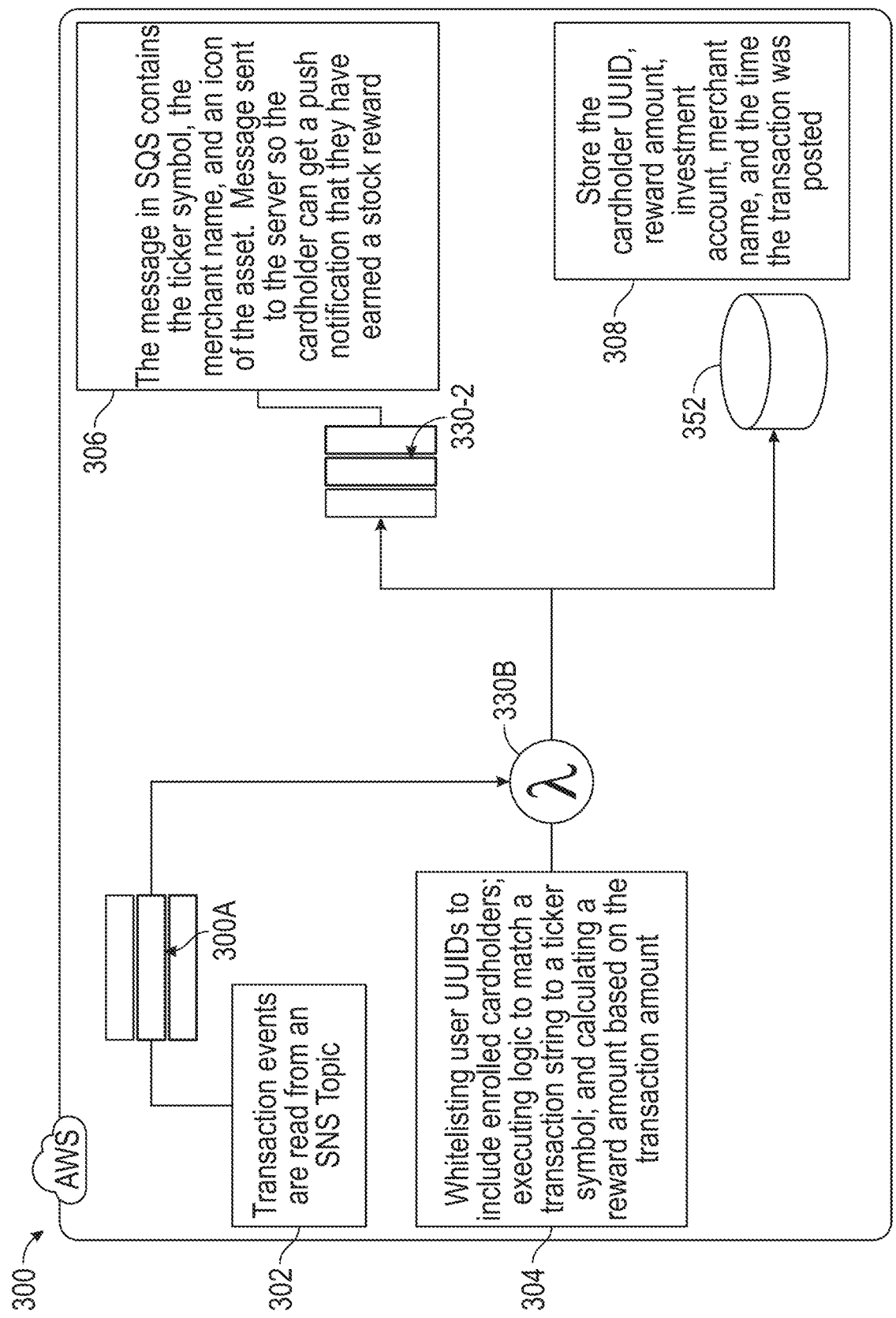
FIG. 3 illustrates a more detailed view of a processing architecture for a stock rewards transaction, according to some embodiments.

FIG. 3 illustrates a more detailed view of a processing architecture 300 for a stock rewards transaction, according to some embodiments. In some embodiments, a cardholder swipes a debit or credit card, or enters the debit or credit card information through an online purchasing service. A banking server 330A hosting or handling the debit or credit card notifies a broker server to which the cardholder is subscribed (e.g., via a message posted to a web-hook, e-mail service, or any other communication via the network) of the transaction. For example, in some embodiments, transaction events are read from a simple notification service (SNS) Topic 302 created by the banking server 330A. In some embodiments, banking server 330A operates an SNS server or e-mail server to receive/transmit such notifications between cardholders, POS devices, and a broker server 330B. In some embodiments, the banking server 330A may use a publicly available distributed streaming platform as a message bus. The transaction message is received and parsed by a processor in broker server 330B, the processor executing commands stored in a memory of broker server 330B or in a database 352 (e.g., processor 212-2 executing instructions stored in stock rewards engine 240). Execution of the code may cause broker server 330B to whitelist universal unique identifiers (UUIDs) in block 304 to include cardholders enrolled in the network service (and exclude those who are not enrolled). Also, execution of the code includes applying a matching logic (e.g., using match analyzer tool 242 or neural network 244) to map a transaction string (e.g., transaction record 227) to a ticker symbol indicative of a publicly traded enterprise enrolled in the network service. Execution of the code also causes broker server 330B to determine a reward amount for the cardholder based on the transaction amount and a cardholder policy.

In some embodiments, the processor in broker server 330B executes an initial validation to verify features of the transaction based on the transaction string. The features of the transaction may include a nature of the transaction, e.g., "Is this a checking transaction? If yes, proceed;" or "Does the transaction contain card data? If yes, proceed." When the initialization checks are validated (e.g., with a "yes" answer to the above questions), the transaction passes to a match analyzer tool (e.g., match analyzer tool 242). The match analyzer tool analyzes the transaction and returns a match result, which contains a ticker symbol, and a match status (match, miss, or blacklist). The match status enables a clear distinction between a blacklist hit and a miss or a positive match. In some embodiments, when a blacklist hit occurs, the system may provide generic stock (e.g., ETF). In some embodiments, when broker server 330B returns a blacklist result, the reward transaction may be canceled. In some embodiments, when the match analyzer tool returns a miss result, broker server 330B may provide a default stock option to the cardholder. In some embodiments, broker server 330B may detect a fraudulent transaction, or the transaction may be returned, canceled, or refunded at the POS or shortly thereafter. In such configurations, a business rule may apply and broker server 330B may return cash to the cardholder, or cancel the rewards process altogether.

When broker server 330B identifies a ticker symbol (e.g., using the match analyzer tool), the broker server sends a message in block 306, via a communications server 330-2, e.g., a simple queue service (SQS) message, to banker server 330A, or directly to the cardholder through a push notification on the mobile device (e.g., client devices 110-1 or 210). The SQS message may include the ticker symbol, the merchant name, and an icon of the asset (e.g., a logo for the publicly traded enterprise). In some embodiments, banker server 330A then pushes a notification to the cardholder (e.g., via a messaging API or e-mail API in the mobile device). The notification may inform the cardholder of the stock reward, the amount, the ticker symbol, or an icon of the publicly traded enterprise, and an update of the debit account. Moreover, in some embodiments, broker server 330B may store the UUID of the cardholder, the reward amount, the investment asset, the merchant name, the time the transaction was posted, and any other transaction details in database 352 at block 308.

Figure 4:
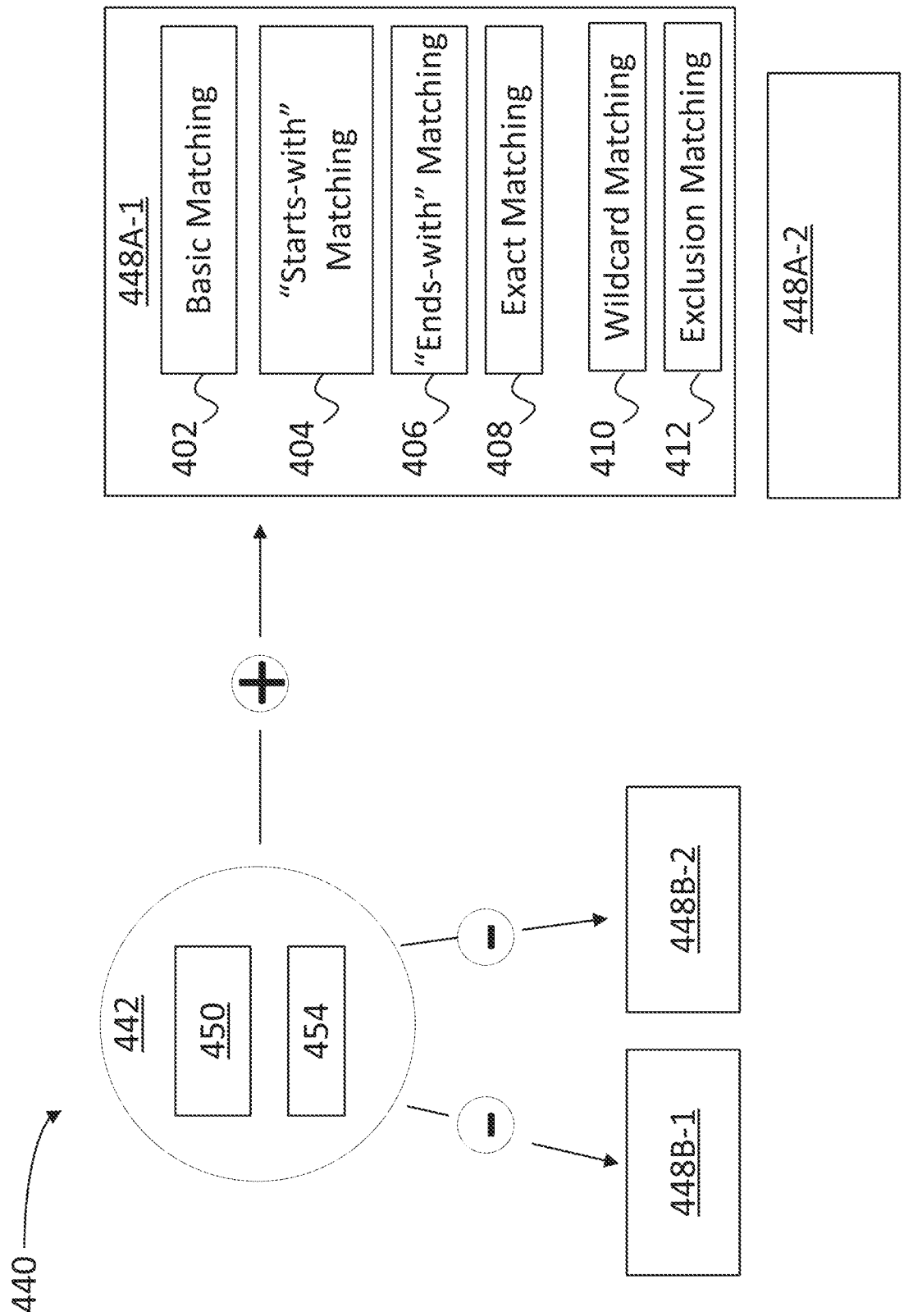
FIG. 4 illustrates lists created by the Match Analyzer tool in a stock rewards transaction engine, according to some embodiments.

FIG. 4 illustrates positive matching list 448A-1 and positive matching list 448A-2 (hereinafter, collectively referred to as "positive matching lists 448A") created by match analyzer tool 442 in a stock rewards transaction engine 440, according to some embodiments. Match analyzer tool 442 parses a transaction string provided by a remote device (e.g., transaction record 227 in client device 210) to identify merchant names, industry codes, and other information that may be matched to an entry in any one of lists 448. In some embodiments, the string includes the merchant name, and a merchant category code (MCC) is provided along with the transaction string, and is not derived from it. In some embodiments, an MCC is a four-digit number for retail financial services, used to classify a business by the types of goods or services it provides. For example, an MCC may be assigned either by merchant type (e.g., one for hotels, one for office supply stores, and the like), or by merchant name. MCCs may be assigned to a merchant by a debit/credit card company (e.g., banking server 330A) when the business first starts accepting that card as a form of payment. In some embodiments, positive matching lists 448A include ticker symbols associated with merchant names, the ticker symbols being, for example, identifiers for a publicly traded company, merchant, or enterprise (e.g., the string "AAPL" associated with Apple Inc. and the like). In some embodiments. positive matching list 448A-2 may be a "secondary" positive matching list, including weaker matching strings. For example, the transaction string may indicate a purchase at a certain venue (e.g., a popular hamburger chain) processed and handled via a mobile electronic appliance by a well-known electronics manufacturer. In such configuration, positive matching list 448A-1 may include the name of the popular hamburger chain, and positive matching list 448A-2 may include the name of the well-known electronics manufacturer. In some embodiments, the reverse may be true (e.g., as determined in the broker server by business rules, machine learning algorithms, and the like), and the well-known electronics manufacturer is included in matching list 448A-1 and the popular hamburger chain is included in matching list 448A-2.

As another example of the use of a secondary matching list 448A-2, a merchant name that contains "google" may match secondarily with google (GOOGL). For example, the string "google something" will match as GOOGL, but the string "google kayak" will match as "booking.com" (the provider of "kayak" travel services) as a primary matching list 448A-1 and as GOOGL as a secondary matching list 448A-2.

To determine a match, match analyzer tool 442 builds several regular expressions to use for fast matching. In some embodiments, each regular expression is created from different lists of strings, including an exclusion list 448B-1, a blacklist 448B-2 (hereinafter, collectively referred to as "negative matching lists 448B"), positive matching list 448A-1, and positive matching list 448A-2. Positive matching lists 448A and negative matching lists 448B will be collectively referred to, hereinafter, as "matching lists 448." Matching lists 448 may be stored in a database (e.g., databases 152, 252, and 352), according to some embodiments.

Exclusion list 448B-1 may include a list of strings that are sub-strings taken directly from real merchant names previously passed through the broker server. Each one of these strings may be combined into a single exclusion regular expression that aims to filter out a merchant from incorrectly matching on a stock for a publicly traded company or ETF. For example, in some embodiments, it may be desirable that a merchant name "LOWES CORNER MARKET" (which shares the same name as the retail company known as Lowe's Companies, Inc., which has the stock ticker symbol "LOW") matches the asset "LOW" in the exclusion list. This avoids rewarding the cardholder with fractional shares of "LOW" stock when a cardholder has made a grocery purchase at "LOWES CORNER MARKET." Accordingly, exclusion list 448B-1 avoids such matching by using the regular expression to identify merchant strings that should return fractional shares of a general ETF instead of stock in a specific publicly traded company.

In some embodiments, match analyzer tool 442 creates blacklist 448B-2 including strings used to build regular expressions intended to identify blacklisted merchants. A blacklisted merchant may include a payment processor or other merchants for which it is not desired to award fractional shares. For example, when a cardholder uses the card in a transaction with a competitor (e.g., cardholder 101 and card 111), or potential competitor, of the network service hosting the broker server (e.g., broker server 130B, 330B), then the broker server may list the competitor's name in blacklist 448B-2. In some embodiments, blacklist 448B-2 may be useful for complying with local rules and regulations for cardholders and stock transactions in certain markets.

For negative matching lists 448B, a match to a transaction string excludes the enterprise associated with the match (e.g., the ticker symbol matching the merchant name in the transaction string) from the fractional stock transaction.

In some embodiments, match analyzer tool 442 also creates lists to build regular expressions into positive matching lists 448A. Matching lists 448 may include:

A "Basic" matching list 402, wherein a merchant name that contains "kayak" matches to "booking.com" stock (ticker BKNG). In some embodiments basic matching list 402 may include Simple matching with merchant code. Accordingly, when there is a merchant name containing "adobe" and merchant code 5734 (Computer Software Stores) will match with adobe stock (ADBE)

A "Starts-with" matching list 404 (e.g., matching a string starting with the characters "AAP***"), in which a merchant name starts with "jet.com" and merchant code 5310 (Discount Stores) matches to walmart stock (WMT). Note that matching list 404 may include "jet.com sale" but not "sale jet.com."

An "Ends-with" matching list 406 (e.g., matching a string ending with the characters "***APL"), and an "Exact" matching list 408 (e.g., matching a string with the exact characters "AAPL").

A "Wildcard" matching list 410 (e.g., matching a string with the characters "*AP*"), wherein a merchant name that has "best" followed by "buy" and merchant code 5732 (Electronic Sales) matches to Best Buy stock (BBY). Note that matching list 410 may include "best something buy" but not "buy something best."

And an exclusion matching 412 wherein a merchant name that contains "vans" but NOT "evans," and merchant code either 5999 (Miscellaneous and Specialty Retail Stores) or 5661 (Shoe Stores) match to VFC stock (VFC is a clothing conglomerate that owns many brands including vans and can be matched with many other merchants as well).

Lists 402, 404, 406, 408, 410 and 412 are intended for building one large regular expression pattern and for faster developer iteration.

In some embodiments, match analyzer tool 442 includes a "rewards map" 454 of basic strings-to-ticker symbols translation (the 'keys' of the map). In some embodiments, match analyzer tool 442 may include a "complex patterns" map 450 (key to value) that builds a regular expression per match, providing a finer control over the match for particular merchants. The more complex matching may introduce a degree of uncertainty to the match performance, and more stringent development and maintenance procedures to maintain accuracy. In some embodiments, a complex matching pattern may include a map of strings to a regular expression pattern wherein, in addition to the merchant name string, which is the main basis for matching (currently, together with the merchant category code), matching lists (positive or negative) created by match analyzer tool 442 (as mentioned above) may include text strings for a city, state/region, industry category, industry code, and industry description, for matching with the transaction string.

Figure 5:
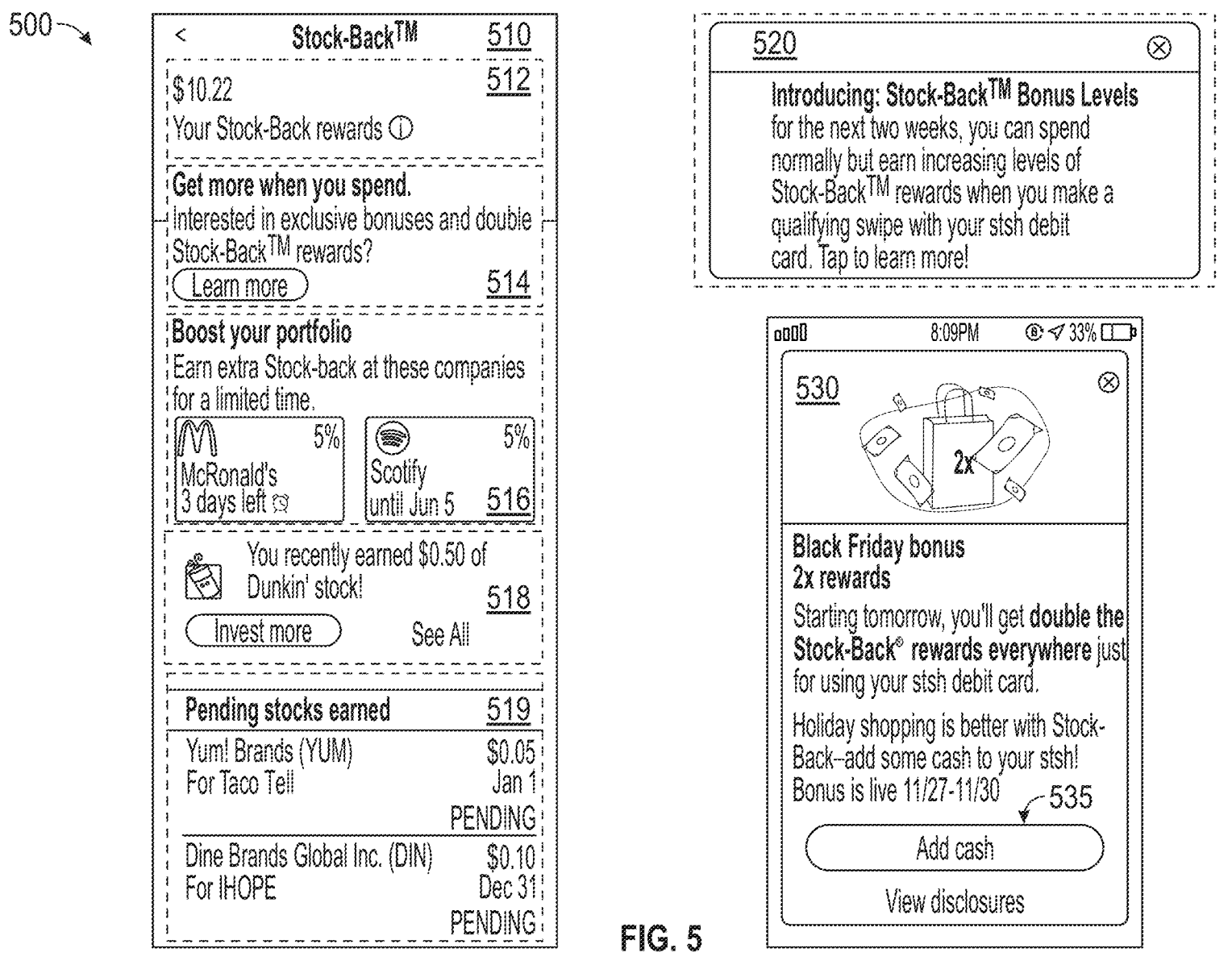

FIG. 5 illustrates graphic payloads 500 for display in cardholder mobile devices (e.g., client devices 110-1 and 210) over pre-selected advertisement campaigns, according to some embodiments. In some embodiments, payloads 500 may be provided by a broker server (e.g., servers 130B, 230, or 330B) to an application running in the cardholder's mobile device (e.g., applications 122 or 222). In some embodiments, graphic payloads 500 may be associated with user promotions wherein certain subscribers to the broker server may earn double stock rewards for a certain period of time, or upon certain threshold of cardholder activity. In some embodiments, a specific merchant or vendor may participate, together with a broker server, in a special reward option (e.g., 3% of the purchases at the merchant or vendor, for a limited period of time and the like).

A block 510 includes a section 512 listing a total value that the cardholder has accrued for stock-back rewards, according to embodiments disclosed herein. A section 514 may include an option for the cardholder to access exclusive bonuses and rewards specials. A section 516 may include other specific options (e.g., "Boost your Portfolio") for enhanced stock-back rewards from certain vendors or service providers. Section 518 may include an enticement for the cardholder to continue shopping with a certain vendor, based on prior activity.

The broker server may provide the offers in sections 516 and 518 based on business rules stored and updated in a database (e.g., business rules 246 and database 252). Section 519 may include a list of pending stock-back rewards, based on completion of the transaction, or reporting activities.

A block 520 includes messages informing the cardholder about upcoming campaigns and offers. The information may be displayed as an active button that the cardholder can tap into to obtain more information.

A block 530 includes an announcement of a specific, time-limited offer of stock-back rewards (e.g., doubling the size of the rewards). Block 530 also includes an action tab 535. The time period offers may include "doubling (2×) all Stock-Back rewards on Black Friday weekend," or "Earn a multiplier on your Stock-Back rewards based on the exact timing of your swipe for a limited time," wherein the exact timing may be a stochastic factor. Other examples of promotions and offers may include user lifecycle behavior or events, such as "Earn 5% Stock-Back rewards on your first Debit card swipe," or "Earn an extra $1 Stock-Back for each of your first 10 swipes if you swipe 10 times in your first 2 weeks after activating the card," or "Earn increasing multiplier "levels" on your Stock-Back rewards by swiping more (e.g., 1-5 swipes=1×, 6-10 swipes=2×, and the like)."

Figure 6:
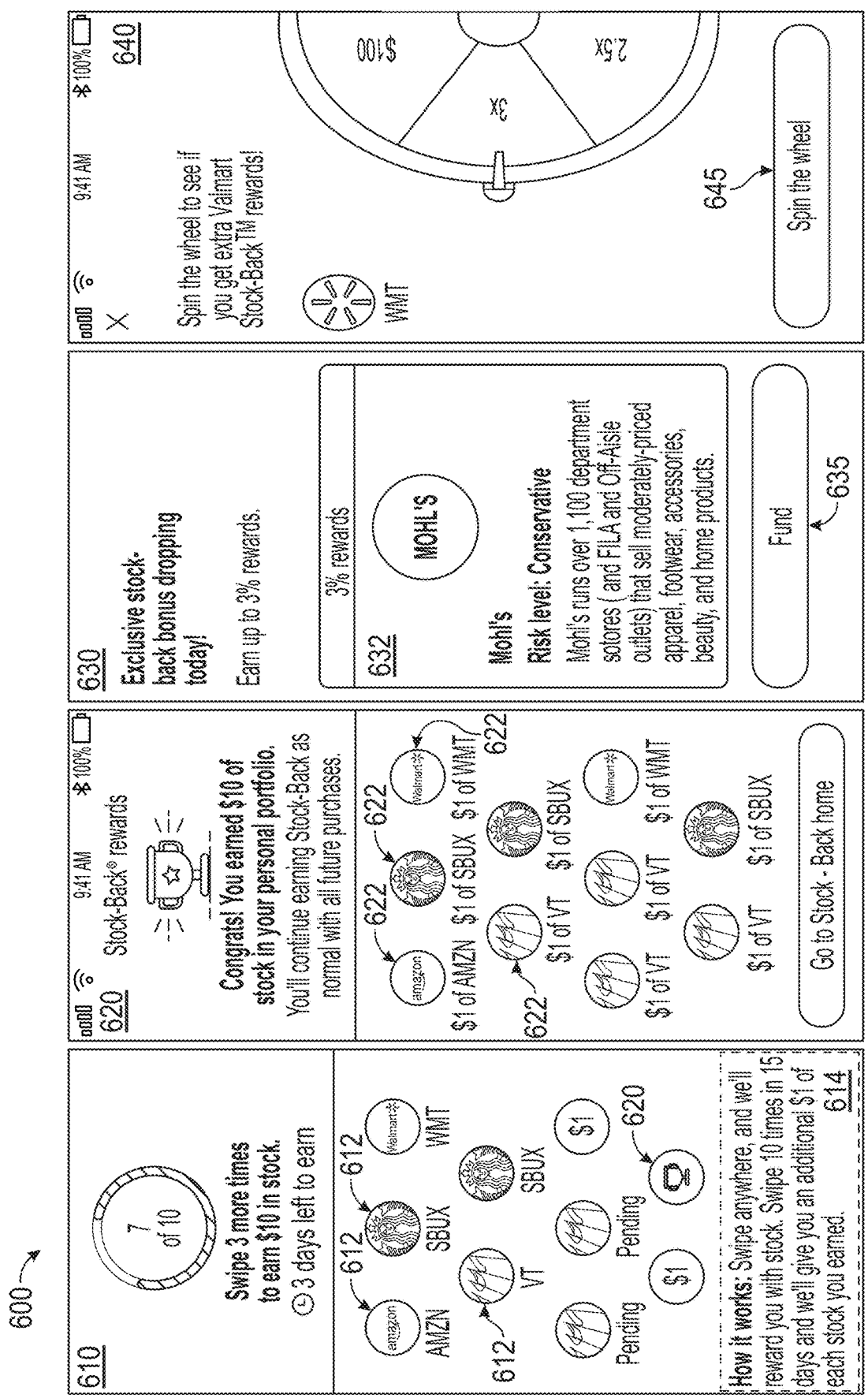
FIG. 6 illustrates more graphic payloads for display in cardholder mobile devices in multiple advertisement strategies, according to some embodiments.

FIG. 6 illustrates more graphic payloads 600 for display in cardholder mobile devices (e.g., client devices 110-1 and 210) in multiple advertisement strategies, according to some embodiments. In some embodiments, payloads 600 may be provided by a broker server (e.g., servers 130B, 230, or 330B) to an application running in the cardholder's mobile device (e.g., applications 122 or 222).

Block 610 includes an enticement display informing the cardholder of an upcoming threshold (e.g., as determined by a business rule). For example, the threshold may be a number (10) of purchases at which the cardholder may accrue a certain added value in stock 620 (e.g., $10 or so, as determined by the business rules), awarded by the broker server. Block 610 may further include a message 614 explaining the mechanics (e.g., 'how it works' or business rule) of a specific offer. In some embodiments, the mechanics includes a number of swipes for a time period (e.g., 'swipe 10 times in 15 days') and a reward ('and earn an additional value of each stock back provided'). Blocks 610 and 620 may also indicate graphically the number and identity of the third party vendors or publicly traded companies 612 whose stock has been awarded to the cardholder. Icons for publicly traded companies 622 may include a graphic symbol for the company, the ticker symbol, and the value of the stock purchased.

Block 630 includes a special offer by a selected vendor. The vendor in block 630 may be selected by the broker server according to the business rules. Block 630 may include an informational note 632 providing details about the stock performance and outlook for the vendor, and an action tab 635 for the cardholder.

Block 640 includes another form of special offer that can be provided by the broker server to an application running in the cardholder's mobile phone. For example, an offer may include a spinning wheel that the cardholder may activate through an action tab 645, wherein the specific value of the offer may be selected by spinning the wheel. In some embodiments, a rule set (e.g., business rules 246) determines the payout based on the fraction of the seconds of the hour that the transaction is initiated or complete.

Figure 7:
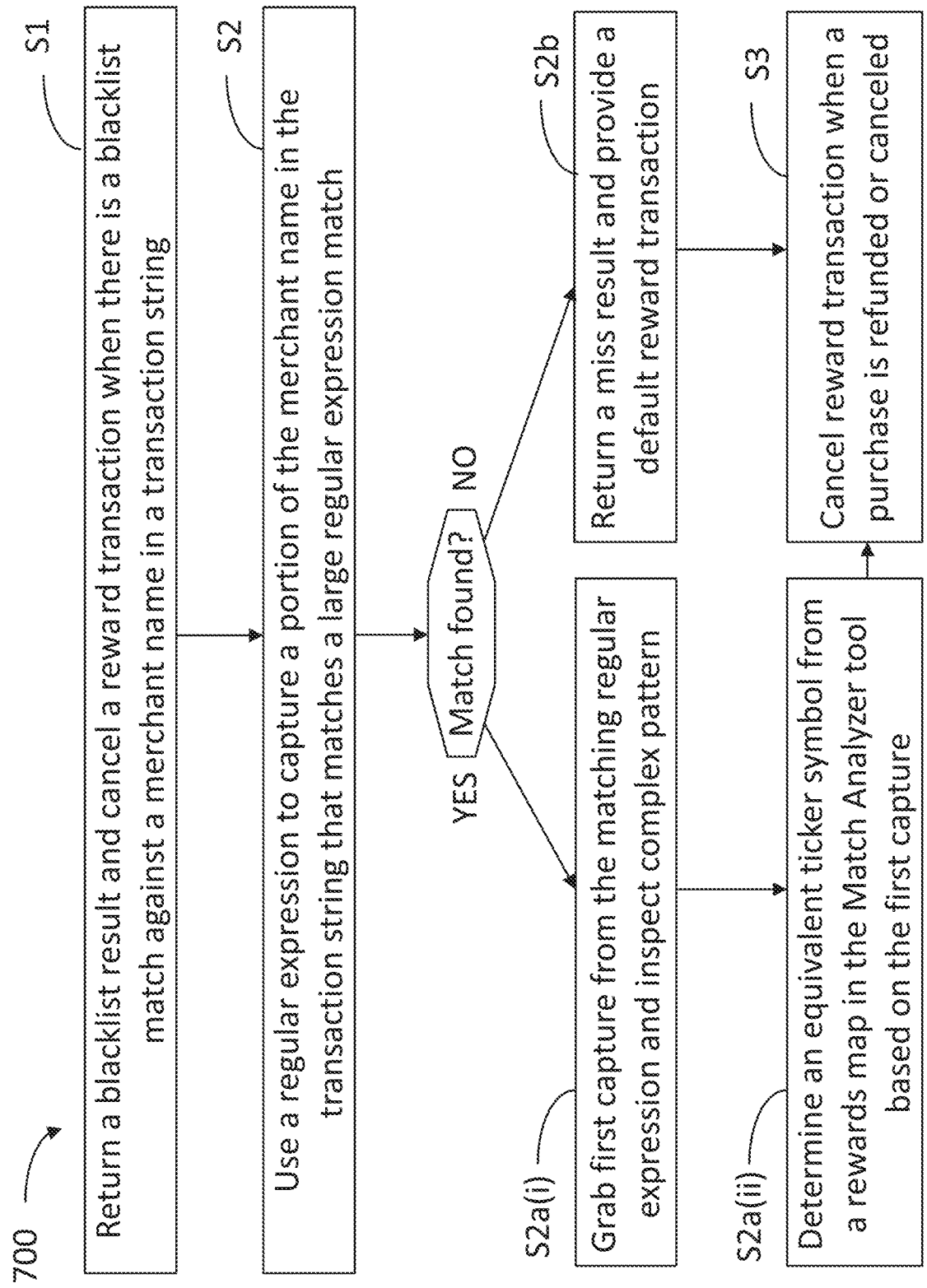
FIG. 7 illustrates steps in a method for mapping at least a portion of a transaction string to a publicly traded enterprise listed in a network service for a broker server, according to some embodiments.

FIG. 7 illustrates steps in a method 700 for mapping at least a portion of a transaction string to a publicly traded enterprise listed in a network service for a broker server, as disclosed herein. In some embodiments, at least one or more of the steps in method 700 may be performed by one or more processor circuits executing instructions stored in memory circuits in at least one of the mobile device, the server, and the database consistent with the present disclosure (e.g., servers 130, 230, and 330, client devices 110 or 210, processor circuits 212, memory circuits 220, databases 152 and 252). In some embodiments, at least one or more of the steps in method 700 may be partially performed by an application running in the mobile device and hosted by one of the servers, and by a stock rewards engine in one of the servers (e.g., applications 122, 222, and stock rewards engine 240). The stock rewards engine may include a match analyzer tool and a neural network operating over a set of business rules, to perform at least one or more of the steps in method 700 (e.g., match analyzer tool 242, neural network 244, and business rules 246). Moreover, in some embodiments, methods consistent with the present disclosure may include at least one of the steps in method 700 performed in a different order, simultaneously, quasi-simultaneously, or overlapping in time.

In some embodiments, the match analyzer tool uses matching fields to determine when a particular transaction maps to an industry, and to award stock based on that industry, even when the match is not exact. In some embodiments, when the transaction string includes a merchant name such as "XYZ Video Game Company," the cardholder may have purchased a video game at a store (or online). In some embodiments, the transaction string "XYZ Video Game Company" may not match a ticker symbol for an enterprise with public stock options in the server network. In such configuration, the Match Analyzer tool may find a match to an enterprise with public options in the server network and within the same, or similar, industry. Accordingly, the Match Analyzer tool may determine an ETF in the server network called "Gamers FTW!" (the underlying ETF being ETFMG Video Game Tech ETF, having a ticker symbol "GAMR"). Further, the Match Analyzer tool then can use the GAMR category to award the cardholder fractional shares based on the purchase, instead of a pre-determined default ETF such as "Stocks Worldwide" (VT ticker symbol). In some embodiments, when the Match Analyzer tool is unable to find even an inexact match such as the GAMR ticker symbol, the system may revert to the pre-determined default ETF ticker symbol.

In some embodiments, the match analyzer tool may perform the following steps in method 700:

S1. Return a "blacklist" result and cancel the reward transaction when there is a blacklist match against the merchant name.

S2. Use the regular expression to capture the portion of the merchant name in the transaction string that matches a large regular expression match (basic/starts-with/ends-with/exact).

S2a. When there is a match, then: S2a(i): grab the first capture from the matching regular expression and inspect the complex patterns map with the first capture to see if there is a more complex pattern to use. In some embodiments, when there is a more complex match hit (e.g., to a blacklist or an exclusion list), then return a miss result, unless there is a more advanced match (e.g., as in secondary match list 448A-2). Some embodiments include pattern matching capabilities that allow specifying more complicated regular expressions which may be desirable for certain merchants (based on the syntax and wording of the merchant's name). And S2a(ii): determine whether the capture from the regular expression has an equivalent ticker symbol, based on a "rewards map" in one of the above lists created by the Match Analyzer tool. This will either return the ticker symbol string (indicating match) or will return a miss result.

S2b. When there is no match, then S2b: Return miss result and provide a default reward transaction. The default reward transaction may include a default stock rewarded to the cardholder based on cardholder preferences (e.g., as ascertained by artificial intelligence or machine learning algorithm, or manually set by the cardholder in the broker server account).

S3. In the event that the purchasing transaction is returned, canceled, or refunded before the stock-back purchase is complete, the system may cancel the stock-back purchase, in some embodiments.

Figure 8:
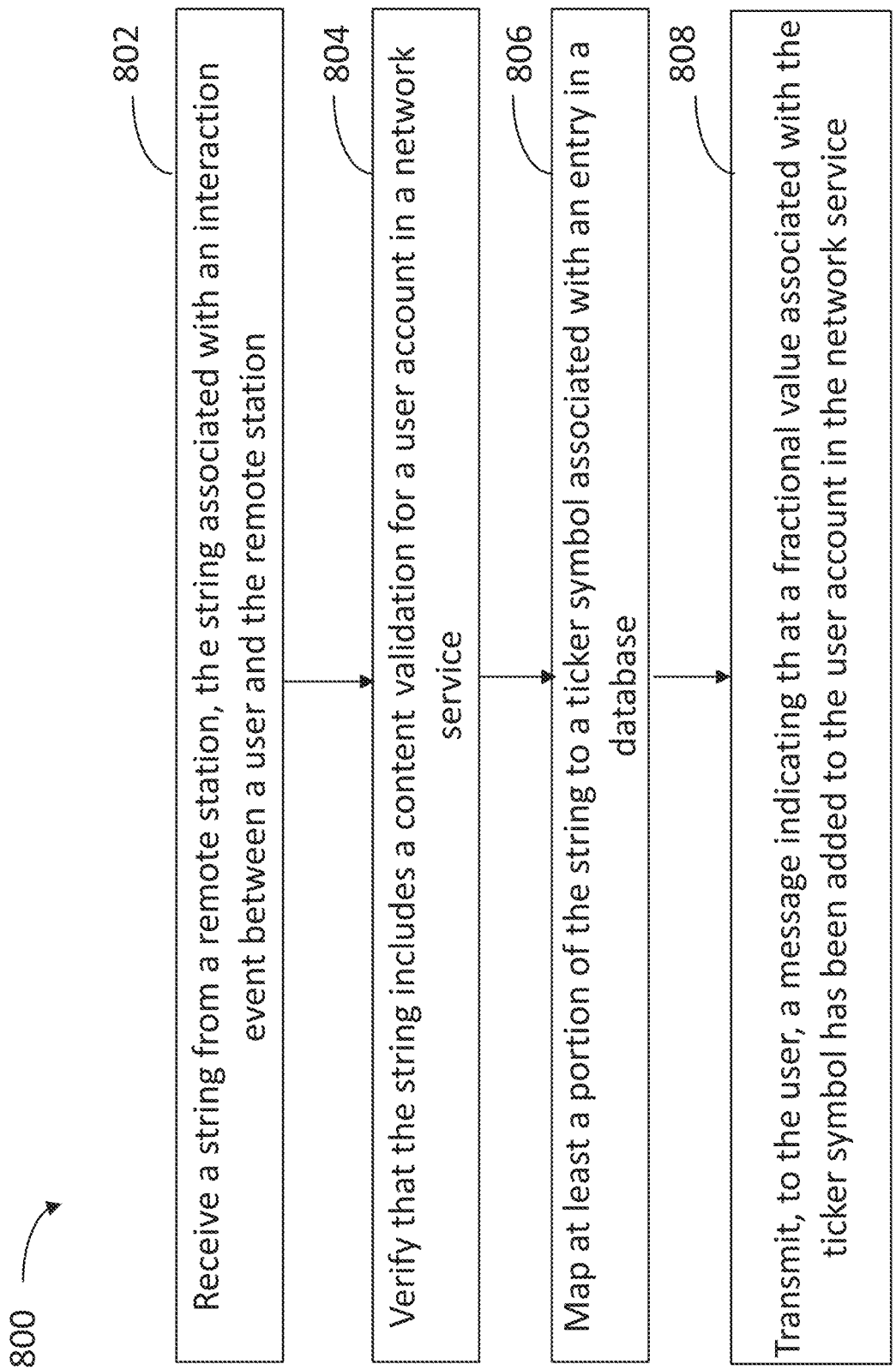
FIG. 8 illustrates steps in a method for providing a value added to a user account upon an interaction event at a remote station, according to some embodiments.

FIG. 8 illustrates steps in a method 800 for providing a value added to a user account upon an interaction event at a remote station, according to some embodiments. More specifically, the user may be a cardholder, the remote station may be a POS device (cashier's computer and the like), and the interaction event may be a purchase by the cardholder of a shopping basket or any other related products at a retailer store, using a debit or credit card. The value added to the user account may include a stock reward, or a fractional value of a publicly offered stock, as disclosed herein. In some embodiments, one or more of the steps in method 800 may be performed by one or more of the devices, databases, and components illustrated in FIGS. 1 and 2, communicatively coupled with one another via a network (e.g., network 150).

In some embodiments, at least one or more of the steps in method 800 may be performed by one or more processor circuits executing instructions stored in memory circuits in at least one of the mobile device, the server, and the database consistent with the present disclosure (e.g., servers 130, 230, and 330, client devices 110 or 210, processor circuits 212, memory circuits 220, databases 152 and 252). In some embodiments, at least one or more of the steps in method 800 may be partially performed by an application running in the mobile device and hosted by one of the servers, and by a stock rewards engine in one of the servers (e.g., applications 122, 222, and stock rewards engine 240). The stock rewards engine may include a match analyzer tool and a neural network operating over a set of business rules, to perform at least one or more of the steps in method 800 (e.g., match analyzer tool 242, neural network 244, and business rules 246). Moreover, in some embodiments, methods consistent with the present disclosure may include at least one of the steps in method 800 performed in a different order, simultaneously, quasi-simultaneously, or overlapping in time.

Step 802 includes receiving a string from the remote station, the string being associated with an interaction event between the user and the remote station. In some embodiments, the string may include a transaction string from the point of sale station associated with a purchase by a cardholder.

Step 804 includes verifying that the string includes a content validation for a user account in a network service. In some embodiments, step 804 includes verifying that the transaction string includes a valid content from the cardholder that subscribes to the network service.

Step 806 includes mapping at least a portion of the string to a ticker symbol associated with an entry in a database. In some embodiments, step 806 includes matching a merchant name string and a merchant category code with an entry associated with the ticker symbol in the database. In some embodiments, step 806 includes returning a miss result when there is no match for the string in the database. In some embodiments, step 806 includes identifying an industry from one of an industry category, an industry code, or an industry description in the portion of the transaction string, and selecting the ticker symbol for a generic trade fund associated with the industry. In some embodiments, the database includes an exclusion list with sub-strings associated with merchant names, and step 806 further includes mapping a transaction string that matches an entry in the exclusion list to one of a miss result or a generic trade fund based on the transaction string. In some embodiments, the database includes a black list with sub-strings associated with merchant names, and step 806 further includes mapping a string that matches an entry in the black list to a blacklist result. In some embodiments, step 806 includes capturing, with a regular expression, the portion of the transaction string, and matching the portion of the string with the entry in the database. In some embodiments, the portion of the string is associated with a merchant managing the point of sale station and includes one of a merchant name string, a purchase location string, an industry category string, an industry code string, and an industry location string, and step 806 includes determining a matching value with an industry in the database, based on the merchant name string, the purchase location string, the industry category string, the industry code string, and the industry location string.

Step 808 includes transmitting, to the user, a message indicating that a fractional value associated with the ticker symbol has been added to the user account in the network service. In some embodiments, step 808 includes transmitting, to the cardholder, a message indicating that a reward of fractional shares of stock associated with the ticker symbol has been included in a personal brokerage account for the cardholder. In some embodiments, step 808 includes adding in the message a public icon of an asset corresponding to the ticker symbol. In some embodiments, step 808 includes determining the reward of fractional shares of stock associated with the ticker symbol based on an amount of the purchase and a subscription policy for the cardholder.

Figure 9:
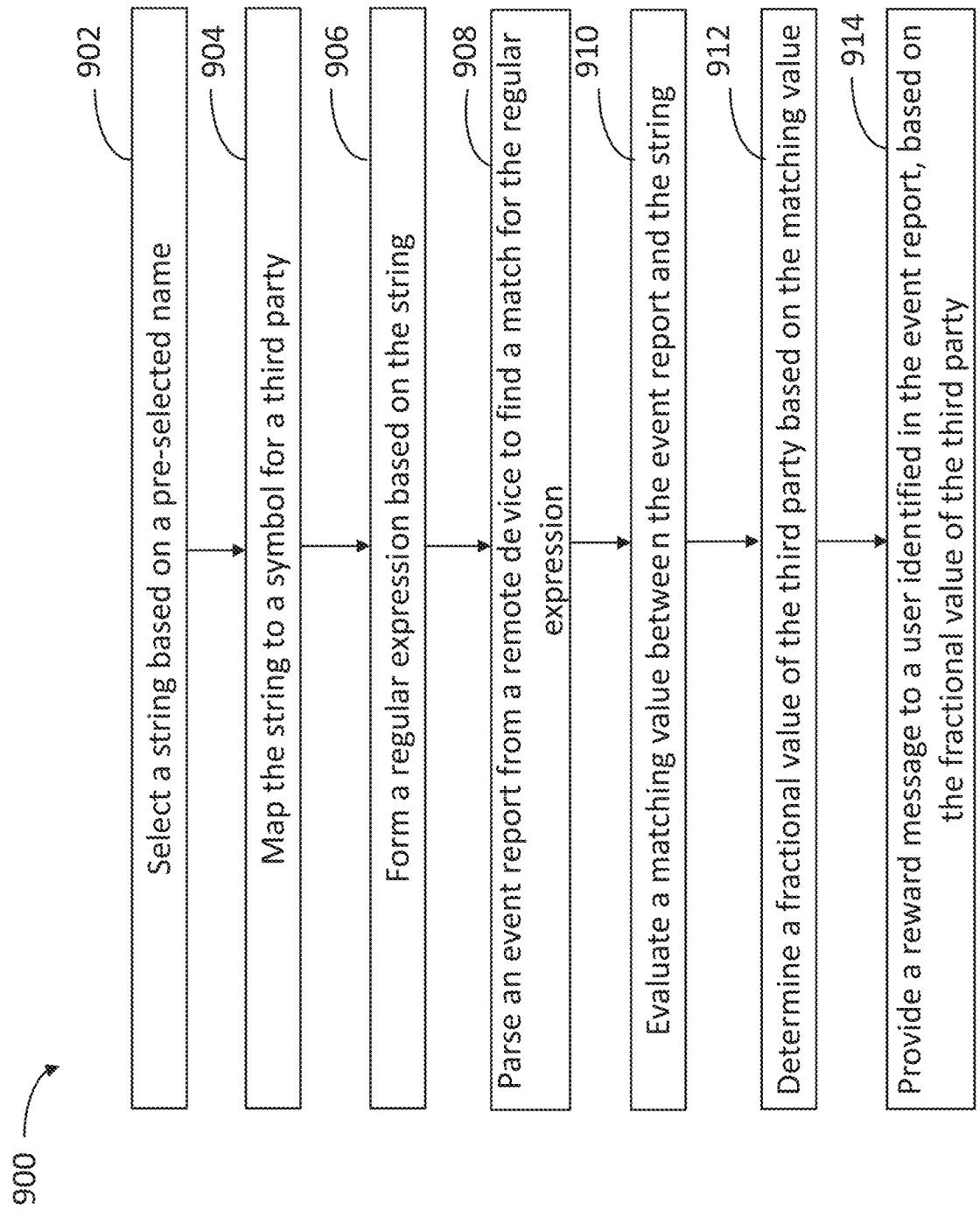
FIG. 9 illustrates steps in a method for rewarding users subscribed to a network service upon a receipt of an event report from a remote device, according to some embodiments.

FIG. 9 illustrates steps in a method 900 for rewarding users subscribed to a network service upon a receipt of an event report from a remote device, according to some embodiments. More specifically, the users may include a cardholder, the remote device may be a POS device (cashier's computer and the like), and the event report may be a receipt for a purchase by the cardholder of a shopping basket or any other related products at a retailer store, using a debit or credit card. The reward may include a stock reward, or a fractional value of a publicly offered stock, as disclosed herein. In some embodiments, one or more of the devices or databases may perform one or more of the steps in method 900 and components illustrated in FIGS. 1 and 2, communicatively coupled with one another via a network (e.g., network 150).

In some embodiments, at least one or more of the steps in method 900 may be performed by one or more processor circuits executing instructions stored in memory circuits in at least one of the mobile device, the server, and the database consistent with the present disclosure (e.g., servers 130, 230, and 330, client devices 110 or 210, processor circuits 212, memory circuits 220, databases 152 and 252). In some embodiments, at least one or more of the steps in method 900 may be partially performed by an application running in the mobile device and hosted by one of the servers, and by a stock rewards engine in one of the servers (e.g., applications 122, 222, and stock rewards engine 240). The stock rewards engine may include a match analyzer tool and a neural network operating over a set of business rules, to perform at least one or more of the steps in method 900 (e.g., match analyzer tool 242, neural network 244, and business rules 246). Moreover, in some embodiments, methods consistent with the present disclosure may include at least one of the steps in method 900 performed in a different order, simultaneously, quasi-simultaneously, or overlapping in time.

Step 902 includes selecting a string based on a pre-selected name. In some embodiments, step 902 includes forming one of a blacklist and a matching list with merchant names.

Step 904 includes mapping the string to a symbol for a third party.

Step 906 includes forming a regular expression based on the string. In some embodiments, step 906 includes selecting, in the regular expression a matching that either starts with the string, ends with the string, or starts and ends with the string.

Step 908 includes parsing an event report from the remote device to find a match for the regular expression.

Step 910 includes evaluating a matching value between the event report and the string. In some embodiments, step 910 includes assigning a value for different patterns of the string matching the event report from the remote device. In some embodiments, step 910 includes identifying at least one of a city, a merchant industry code, a merchant industry description, a merchant name, and a state or region of purchase from the string in the event report from the remote device.

Step 912 includes determining a fractional value of the third party based on the matching value.

Step 914 includes providing a reward message to a user identified in the event report, based on the fractional value of the third party.

Hardware Overview

Figure 10:
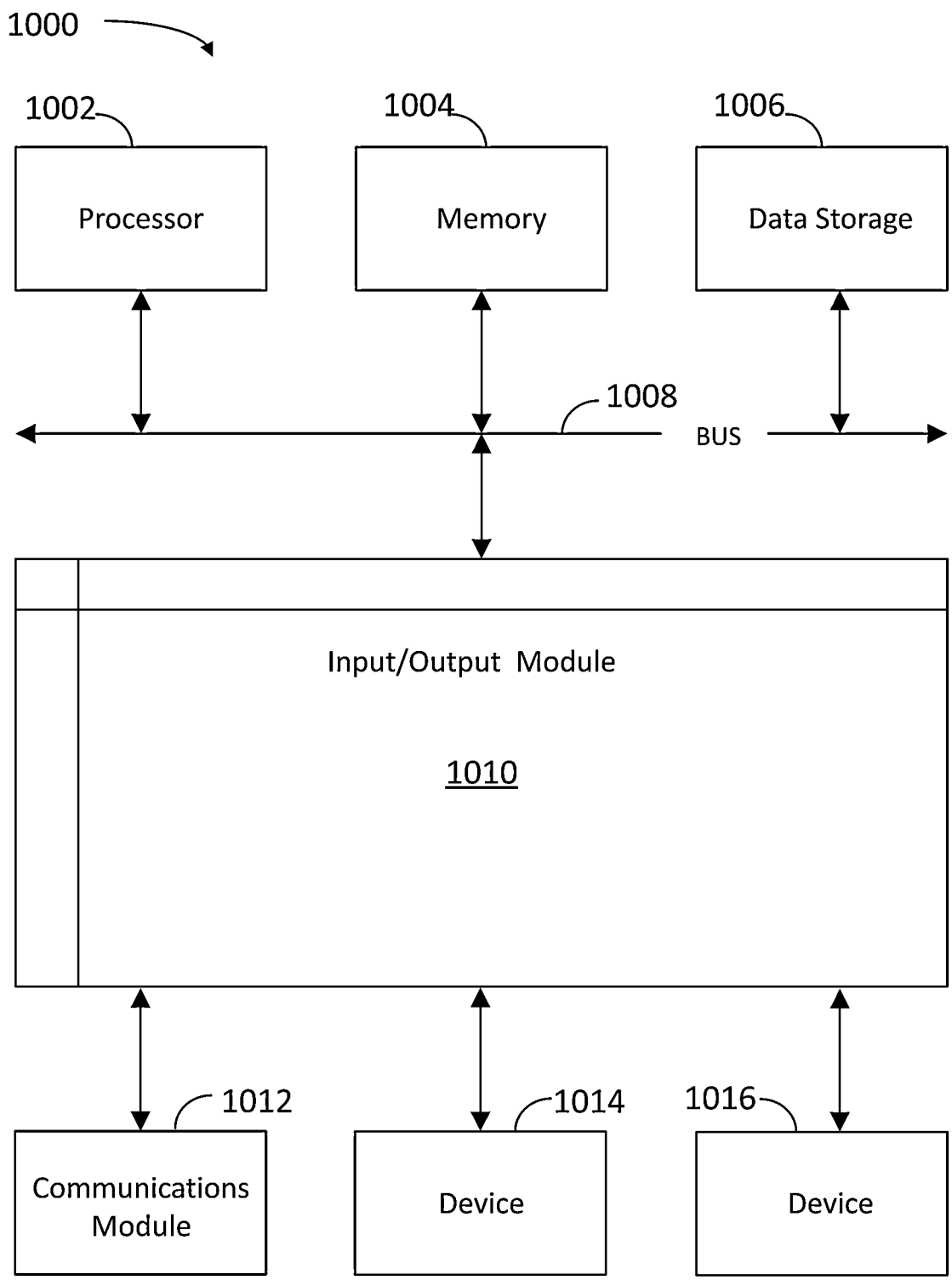
FIG. 10 is a block diagram illustrating an example computer system with which the client and server of FIGS. 1 and 2 and the methods of FIGS. 8-9 can be implemented, according to some embodiments.

FIG. 10 is a block diagram illustrating an example computer system with which the client and server of FIGS. 1 and 2 and the methods of FIGS. 8-9 can be implemented, according to some embodiments. In certain aspects, the computer system 1000 may be implemented using hardware or a combination of software and hardware, either in a dedicated server, or integrated into another entity, or distributed across multiple entities.

Computer system 1000 (e.g., client 110 and server 130) includes a bus 1008 or other communication mechanism for communicating information, and a processor 1002 (e.g., processors 212) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memory 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer-readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 (e.g., communications modules 218) include networking interface cards, such as Ethernet cards and modems. In certain aspects, input/output module 1010 is configured to connect to a plurality of devices, such as an input device 1014 (e.g., input device 214) and/or an output device 1016

(e.g., output device 216). Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1016 include display devices, such as an LCD (liquid crystal display) monitor, for displaying information to the user.

According to one aspect of the present disclosure, the client 110 and server 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

In one aspect, a method may be an operation, an instruction, or a function and vice versa. In one aspect, a clause may be amended to include some or all of the words (e.g., instructions, operations, functions, or components) recited in either one or more clauses, one or more words, one or more sentences, one or more phrases, one or more paragraphs, and/or one or more clauses.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience only and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the clauses. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each clause. Rather, as the clauses reflect, inventive subject matter lies in less than all features of a single disclosed configuration or operation. The clauses are hereby incorporated into the detailed description, with each clause standing on its own as a separately described subject matter.

The clauses are not intended to be limited to the aspects described herein, but are to be accorded the full scope consistent with the language clauses and to encompass all legal equivalents. Notwithstanding, none of the clauses are intended to embrace subject matter that fails to satisfy the requirements of the applicable patent law, nor should they be interpreted in such a way.

What is claimed is:

1. A computer-implemented method, comprising:
    selecting, in a remote server, from a remote station, a string based on a pre-selected name;
    mapping the string to a symbol for a third party;
    forming a regular expression based on the string;
    parsing an event report from a remote device to find a match for the regular expression;
    evaluating a matching value between the event report and the string;
    determining a fractional value of the third party based on the matching value;
    providing, via a communications module, a graphic payload to a user interface in a client device for a user, the graphic payload including active components;
    receiving, from the user, an activation signal from one of the active components;
    providing, with a communications module in the remote server, a reward message to the user identified in the event report, based on the fractional value of the third party and the activation signal from one of the active components; and
    modifying a rewards account for the user based on a business rule in the remote server, wherein selecting a text string based on a merchant name comprises forming one of a blacklist according to a business rule in the remote server for a competing merchant and a matching list with non-competing merchant names.

2. The computer-implemented method of claim 1, wherein forming a regular expression based on the string comprises selecting, in the regular expression a matching that either starts with the string, ends with the string, or starts and ends with the string.

3. The computer-implemented method of claim 1, wherein evaluating a matching value between the event report from the remote device and the string comprises assigning a value for different patterns of the string matching the event report from the remote device.

4. The computer-implemented method of claim 1, wherein evaluating a matching value between the event report from the remote device and the string comprises identifying at least one of a city, a merchant industry code, a merchant industry description, a merchant name, and a state or region of purchase from the string in the event report from the remote device.

5. The computer-implemented method of claim 1, wherein the graphic payload is a random selector to be graphically activated by the user, and modifying a rewards account comprises randomly selecting one of a plurality of options provided by the graphic payload when the user activates the random selector.

6. The computer-implemented method of claim 1, wherein transmitting a rewards message comprises including in the rewards message a public icon of an asset associated with the third party.

7. The computer-implemented method of claim 1, wherein determining the fractional value of the third party comprises assessing an interaction value and a subscription policy for the user.

8. The computer-implemented method of claim 1, wherein the string includes information associated with a purchasing card with the user, and providing a reward message to the user comprises offering an increased reward for use of the purchasing card in a selected time window.

9. The computer-implemented method of claim 1, wherein the string includes information associated with a purchasing card with the user, and providing a reward message to the user comprises increasing the fractional value of the third party for purchases at a selected third party.

10. A system, comprising:
one or more processors; and
a memory storing instructions which, when executed by the one or more processors, cause the system to:
select, in a remote server, from a remote station, a string based on a pre-selected name;
map the string to a symbol for a third party;
form a regular expression based on the string;
parsing an event report from a remote device to find a match for the regular expression;
evaluate a matching value between the event report and the string;
determine a fractional value of the third party based on the matching value;
provide, via a communications module, a graphic payload to a user interface in a client device for a user, the graphic payload including active components;
receive, from the user, an activation signal from one of the active components;
provide, with a communications module in the remote server, a reward message to the user identified in the event report, based on the fractional value of the third party and the activation signal from one of the active components; and
modify a rewards account for the user based on a business rule in the remote server, wherein to select a text string based on a merchant name the one or more processors execute instructions to form one of a blacklist according to a business rule in the remote server for a competing merchant and to form a matching list with non-competing merchant names.

11. The system of claim 10, wherein to form a regular expression based on the string the one or more processors execute instruction to select, in the regular expression a matching that either starts with the string, ends with the string, or starts and ends with the string.

12. The system of claim 10, wherein to evaluate a matching value between the event report from the remote device and the string the one or more processors execute instructions to assign a value for different patterns of the string matching the event report from the remote device.

13. The system of claim 10, wherein to evaluate a matching value between the event report from the remote device and the string the one or more processors execute instructions to identify at least one of a city, a merchant industry code, a merchant industry description, a merchant name, and a state or region of purchase from the string in the event report from the remote device.

14. The system of claim 10, wherein the one or more processors further execute instructions to provide in the graphic payload, a random selector to be graphically activated by the user, and to modify a rewards account comprises randomly selecting one of a plurality of options provided by the graphic payload when the user activates the random selector.

15. The system of claim 10, wherein to transmit a rewards message the one or more processors execute instructions to include in the rewards message a public icon of an asset associated with the third party.

16. The system of claim 10, wherein to determine the fractional value of the third party the one or more processors execute instructions to assess an interaction value and a subscription policy for the user.

17. The system of claim 10, wherein the string includes information associated with a purchasing card with the user, and to provide a reward message to the user the one or more processors execute instructions to offer an increased reward for use of the purchasing card in a selected time window.

18. The system of claim 10, wherein the string includes information associated with a purchasing card with the user, and to provide a reward message to the user the one or more processors execute instructions to increase the fractional value of the third party for purchases at a selected third party.

\* \* \* \* \*